United States Patent [19]
Hess et al.

[11] Patent Number: 5,197,541
[45] Date of Patent: Mar. 30, 1993

[54] APPARATUS FOR TWO PHASE VACUUM EXTRACTION OF SOIL CONTAMINANTS

[75] Inventors: Ronald E. Hess, Webster; Albert A. Hooper, Pittsboro, both of N.Y.; Steven R. Morrow, Hatboro, Pa.; Dianne J. Walker, Norristown, Pa.; Erich Zimmerman, Collegeville, Pa.

[73] Assignee: Xerox Corporation, Stamford, Conn.

[21] Appl. No.: 729,652

[22] Filed: Jul. 15, 1991

Related U.S. Application Data

[62] Division of Ser. No. 413,273, Sep. 27, 1989, Pat. No. 5,050,676.

[51] Int. Cl.$^5$ .................................. E21B 43/34
[52] U.S. Cl. .................... 166/67; 166/75.1; 166/267; 166/370
[58] Field of Search ............ 166/267, 370, 369, 105.5, 166/74, 68, 75.1, 67

[56] References Cited

U.S. PATENT DOCUMENTS

| | | | |
|---|---|---|---|
| Re. 33,102 | 10/1989 | Visser et al. | 166/267 |
| 3,743,355 | 7/1973 | Blackwell et al. | 166/370 X |
| 4,323,122 | 4/1982 | Kropik | 166/267 |
| 4,444,260 | 4/1984 | Boyd et al. | 166/267 |
| 4,593,760 | 6/1986 | Visser et al. | 166/267 |
| 4,660,639 | 4/1987 | Visser et al. | 166/267 |
| 4,730,672 | 3/1988 | Payne | 166/267 X |
| 4,886,119 | 12/1989 | Bernhardt et al. | 166/370 X |
| 4,890,673 | 1/1990 | Payne | 166/267 X |
| 4,892,664 | 1/1990 | Miller | 166/267 X |
| 4,982,788 | 1/1991 | Donnelly | 166/267 X |
| 5,009,266 | 4/1991 | Dieter | 166/267 X |
| 5,018,576 | 5/1991 | Udell et al. | 166/272 |
| 5,050,676 | 9/1991 | Hess et al. | 166/267 |

OTHER PUBLICATIONS

Air & Waste Management Association, "EPA Site Demonstration of the Terra Vac In Situ Vacuum Extraction Process in Groveland Mass.", by Mary K. Stinson, vol. 39, No. 8, pp. 1054-1062 (page 1061 missing) (issue of Aug. 1989).

American Petroleum Institute, API Publication No. 4431, Jan. 1984, "Forces Venting to Remove Gasoline Vapor from a Large-Scale Model Aquinfer".

J. Environ. Sci. Health, Paper No. A17(1), 31-44 (1982), "Venting For Removal of Hydrocarbon Vapors from Gasoline Contaminated Soil".

*Primary Examiner*—Hoang C. Dang
*Attorney, Agent, or Firm*—Judith L. Byorick

[57] ABSTRACT

A process for two phase vacuum extraction of contaminants from the ground involves vacuum withdrawal of liquid and gaseous phases as a common stream, separation of the liquid and gaseous phases, and subsequent treatment of the separated liquid and gases to produce clean effluents. Two phase vacuum extraction employs a single vacuum generating device to remove contaminants in both the liquid stream and soil gases through a single well casing.

7 Claims, 4 Drawing Sheets

APPARATUS FOR TWO PHASE VACUUM EXTRACTION OF SOIL CONTAMINANTS

This is a division of application Ser. No. 413,273, filed Sep. 27, 1989, now the U.S. Pat. No. 5,050,676.

BACKGROUND OF THE INVENTION

1. Field of the Invention

This invention relates to a process and apparatus for removing chemical contaminants from soil, and more particularly to a process and apparatus in which vacuum extraction is used to remove contaminants in both liquid and gaseous phases. The invention relates to a process and apparatus for (1) the removal from soil of volatile organic compounds, (2) continuous and simultaneous remediation of the treated soil and (3) the removal of ground water and suspended or dissolved contaminants.

Contaminants may exist in subsurface soil in the liquid or vapor phase as discrete substances and mixed with and/or dissolved in ground water and soil gases. Such contaminants may be found and dealt with in accordance with this invention in the vadose (unsaturated) zone found between the surface of the earth and the water table, at the interface between the vadose zone and the water table, and in the saturated zone below the water table.

2. Description of the Prior Art

At many industrial and commercial facilities and at waste handling and disposal sites, soil and ground water are contaminated with suspended or water-soluble chemicals, or both.

A variety of techniques have been used for removal of soil contaminants and remediation of affected soil. One common technique involves the excavation and off-site treatment of the soil. Another technique involves saturating the contaminated soil with water in situ, causing the contaminants to be slowly leached from the soil by the water. The contaminated water can then be removed.

Techniques have also been proposed for removing volatile organic contaminants from soil by vacuum extraction. For example, in U.S. Pat. No. 4,323,122, it was proposed that a vacuum be applied in a borehole at the level of the water table, the assumption being that a contaminant such as gasoline, which is lighter than water for example, would float on the water table and present a layer which could be drawn off by vacuum applied to the liquid at or around that level.

Others have suggested the possibility of venting soil above the water table (i.e., in the vadose zone) to cause vaporization of the contaminant in the soil, and then drawing off the contaminant in the vapor phase. Thus, conventional vacuum extraction systems are designed to clean the vadose zone by applying vacuum to draw air through the soil through wells having screening which does not extend below the water table. Ground water requiring treatment is in such processes conventionally removed by pumping from separate conventional water wells. In situations in which water does flow into vacuum extraction wells, it has been suggested that a second, liquid phase pump be placed either in the well or at the surface to remove the water through a second conduit. Thus, conventionally, water wells separate and apart from vacuum extraction wells may be required at a given site, and water pumps in addition to vacuum generation devices may be employed. In accordance with the present invention, which exploits two phase vacuum extraction, a single vacuum device removes contaminants in both the water and the soil gases by way of a single conduit formed by the well casing.

SUMMARY OF THE INVENTION

The present invention involves a process and apparatus for two phase removal of contaminants from the soil, in which contaminants are typically present in the vadose zone and below the water table. The process involves the steps of providing a borehole in the contaminated area; placing in the borehole a riser pipe, the riser pipe preferably being so constructed as to admit fluids both from the vadose zone and from below the natural water table; applying a vacuum to the riser pipe so as to draw soil gases and entrained liquid into the riser pipe and to transport both the gases and the liquid to the surface; separating the liquid and the gases, and separately subjecting the separated liquid and gases to appropriate treatment. Treated water may be returned to the soil or disposed of in conventional ways. In one embodiment of the invention (which constitutes the best mode contemplated for carrying the invention into effect), the well casing is constructed with perforations (screening) extending below the natural water table and also upward into the unsaturated (vadose) zone. The unsaturated zone may be the natural vadose zone lying above the natural water table, or an expanded "artificial" vadose zone created when removal of the ground water through the extraction well causes local lowering of the water table. Placing of the screening so that it extends into the vadose zone allows soil gases, including contaminants in the vapor phase, to be drawn into the well under the influence of a vacuum generator. The gases, it has been found, entrain the liquid phase, so that both phases may be transported to the surface together in a common stream. At the surface, the two phases are separated in a vapor-liquid disengaging vessel, such as a cyclone separator, knock-out pot or other suitable component, and after separation the phases may individually be routed to systems for contaminant removal by further treatment steps. Suitable processes for contaminant removal include filtration, adsorption, air stripping, settling, flocculation, precipitation, scrubbing and the like.

As an alternative, the treatment well may be constructed so that screening is at all times is below the water table, even in the situation in which removal of water causes local depression of the water table. In such an arrangement, the fluid transported to the surface would predominantly be in the liquid phase, although it may still be necessary to provide vapor-liquid separation and individual phase treatment at the surface to deal with phase transformation which may occur as a result of turbulence and pressure reduction at the suction side of the vacuum device.

Two phase vacuum extraction in accordance with the present invention improves over known soil and ground water remediation vacuum extraction techniques by simplifying equipment requirements and increasing the rate of recovery of ground water. Unlike the prior art, water wells and pumps distinct from the extraction well are not required. A single vacuum device serves to remove contaminants in both the vapor and liquid phases, using a single conduit.

BRIEF DESCRIPTION OF THE DRAWINGS

There is seen in the drawings a form of the invention which is presently preferred (and which represents the best mode contemplated for carrying the invention into effect), but it should be understood that the invention is not limited to the precise arrangements and instrumentalities illustrated.

DETAILED DESCRIPTION

Figure 1:
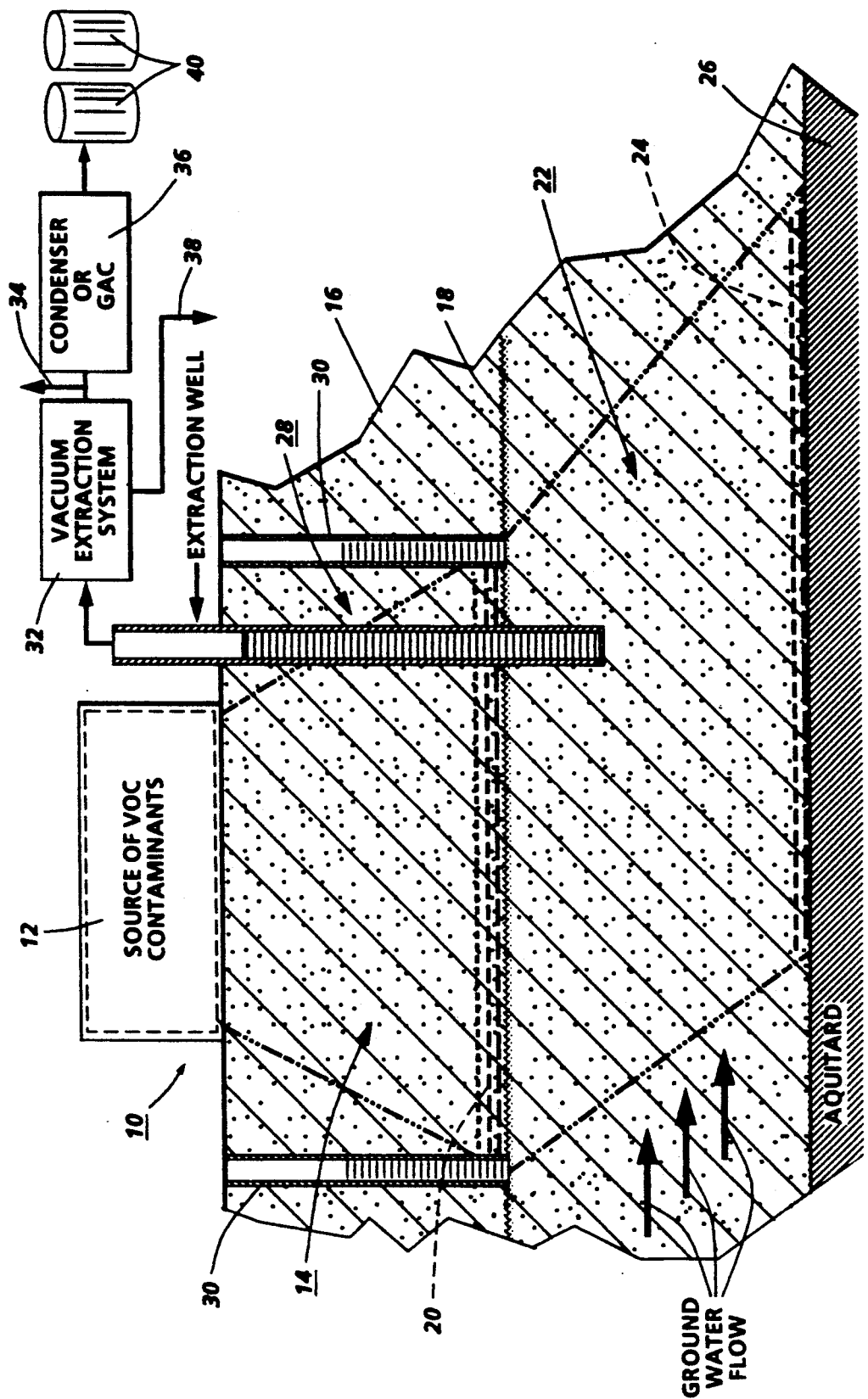
FIG. 1 is a side elevation view, in cross-section, illustrating somewhat schematically an arrangement for two phase vacuum extraction for removal of contaminants from a contaminated area of the ground.

Referring now to FIG. 1, there is seen schematically a system, designated generally by the reference numeral 10, for two phase vacuum extraction and treatment in accordance with the invention. Seen in FIG. 1 is a source 12 of volatile contaminants, creating a plume 14 of absorbed or suspended contaminants in the soil 16 of the vadose (unsaturated) zone. The contaminants making up the plume 14 tend to leach or percolate downwardly toward the natural water table 18. Components lighter than water and not dissolved are depicted by the reference numeral 20, and tend to float at the top of the water table. Dissolved contaminants and free-phase contaminants lighter than water tend to percolate downwardly in a plume 22 below the water table 18, and free-phase components 24 heavier than water tend to migrate downwardly to the aquitard 26.

An extraction well, designated generally by the reference numeral 28, and which will be described in greater detail shortly, is sunk in the area of the plume 14 and extends through the vadose zone and below the natural water table 18. Spaced from the extraction well 28 are air inlet wells, designated by the reference numeral 30, and which will also be described in greater detail. Air inlet wells 30, it will be understood, are best disposed at spaced locations around the perimeter of the plume 14. Those skilled in the art will appreciate that the number and spacing of the air inlet wells 30 with respect to the plume 14 and extraction well 28 will depend upon the size of the plume 14, as well as the composition and permeability of the soil to be treated.

Associated with the extraction well 28 is a vacuum extraction system, designated by the reference numeral 32. Gases removed by the vacuum extraction system 32 may be vented to atmosphere at 34 if within acceptable environmental limits, or further processed such a by being incinerated or passed to a condenser, granular activated carbon filter, or other such component 36. The component 36 serves to remove contaminants from the extracted gases. Water extracted by the process may be treated by passing it through conventional systems for metals removal, volatile organic compound removal, or other steps of purification. The treated and purified water, if it is of sufficient purity at this stage, may be returned to a sewer or directly to the ground as indicated at 38. Contaminants may be stored in drums 40 for eventual destruction or further processing.

Figure 3:
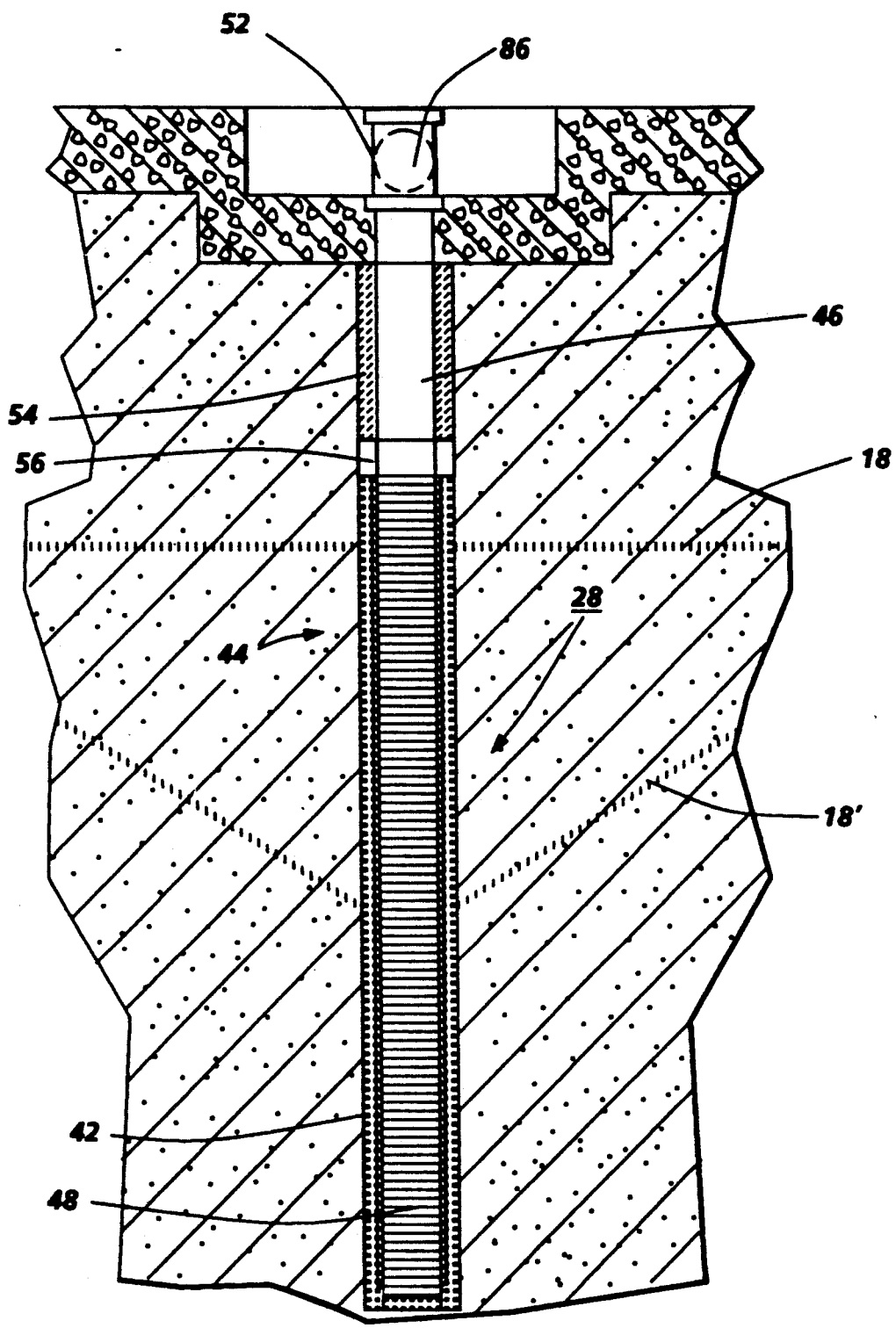
FIG. 3 is a cross-sectional view, in side elevation, of an extraction well which may be used with the apparatus of FIG. 1.

Referring now to FIG. 3, the extraction well 28 will be described in greater detail. The extraction well 28 in the illustrated form of the invention includes an elongated borehole 42, into which there is placed a riser pipe 44. The riser pipe 44 includes an inperforate upper portion 46 and a perforate (screened) lower portion 48. In one operative example, the riser pipe 44 is of four inch diameter PVC, capped at the bottom, and the screen consists of 0.010 inch slots. In the operative example, the riser pipe 44 was approximately twenty feet in length, with the lower fifteen feet comprising the slotted lower portion 48 and the upper five feet the imperforate upper portion 46. The upper end of the riser pipe 44 is here shown to be is associated with a concrete floor or deck, and is provided with a suitable pipe fitting 52, enabling the riser pipe 44 to be coupled in fluid communication to the remainder of the vacuum extraction system 32 (not seen in FIG. 3). The upper portion 46 of the riser pipe 44 is surrounded by a low permeability grout, such as bentonite cement 54, and below the grout 54 by a bentonite seal 56. The area within the borehole 42 surrounding the slotted lower portion 48 of the riser pipe 44 and part of the upper portion 46 above the slotted lower portion 48 is packed with fine screened sand, to facilitate the flow of gas and liquid from the surrounding soil into the riser pipe 44. In a preferred form of the invention, the extraction well 28 is constructed so that the screened lower portion 48 extends below the natural water table and upwardly into the vadose zone. The vadose zone into which the screened lower portion 48 extends may be the natural water table 18, or the expanded artificial vadose zone created when prolonged removal of ground water through the extraction well causes local lowering of the water table as indicated by the reference numeral 18' in FIG. 3. Placement of the screened lower portion 48 of the riser pipe 44 as indicated above allows soil gases (the vapor phase) to be drawn into the well under the influence of vacuum created by the extraction system 32 and to entrain the liquid phase so that both phases may be transported to the surface together. As will be explained, at the surface, the two phases may be separated and differently treated.

Alternatively, the extraction well 28 may be so constructed that the screening of the lower portion 48 is entirely submerged, i.e., disposed below the natural or actual water table even after withdrawal of water from the aquifer under the influence of the vacuum extraction system 32. In the latter case, the fluid transported to the surface would be predominantly in the liquid phase.

Figure 4:
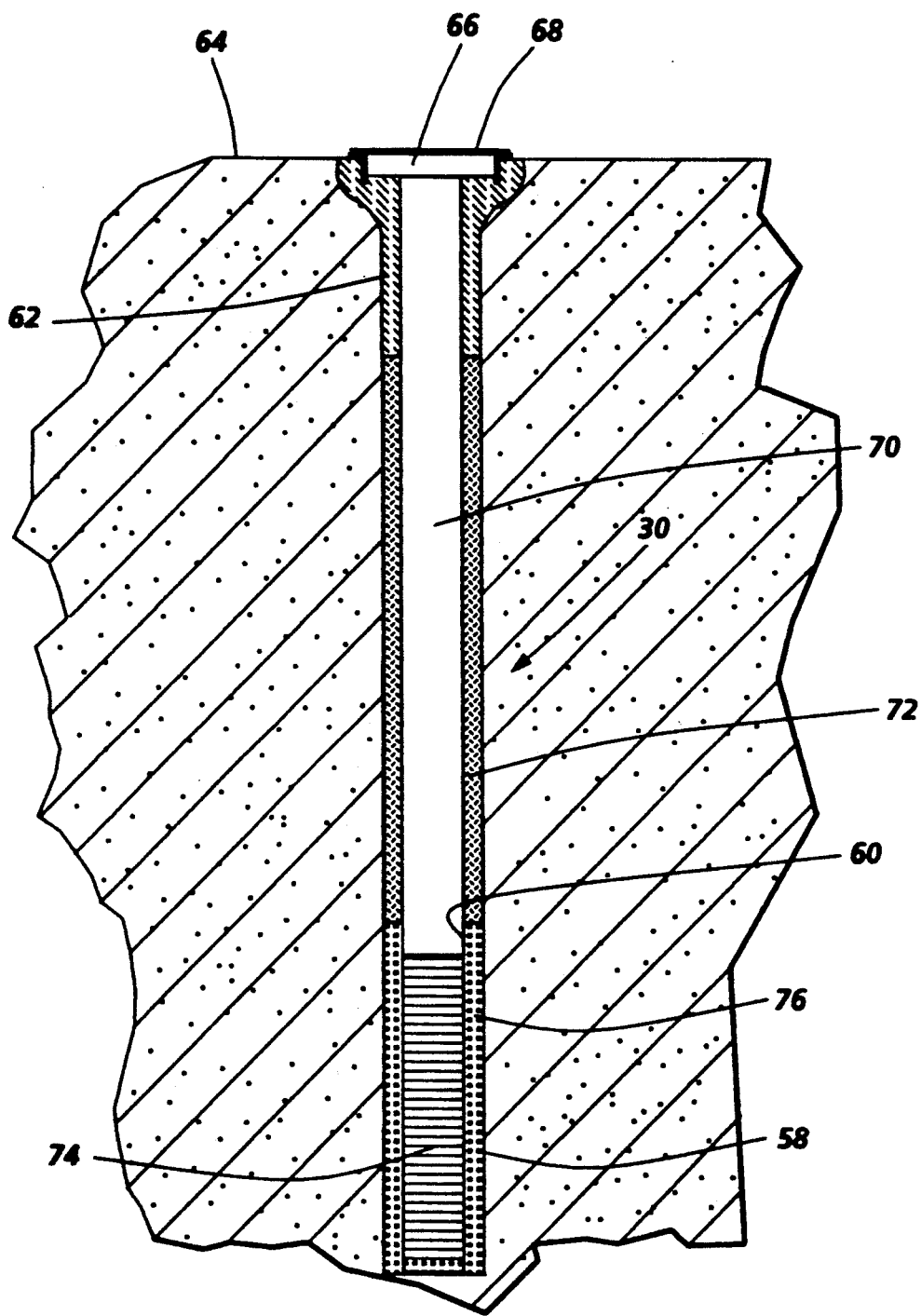
FIG. 4 is a cross-sectional view, also in side elevation of, an air inlet well intended for use in the present invention.

Referring now to FIG. 4, there is seen an example of an air inlet well 30. The air inlet well 30 comprises a borehole 58, which receives a pipe 60. The pipe 60 in one operative embodiment comprises a four inch diameter PVC pipe, capped at the bottom, and having a screen of 0.010 inch slots. The pipe 60 is surrounded at its upper end by a cement collar 62, extending to the ground surface 64. Suitable caps 66 and covers 68 may be provided in association with the collar 62 to selectively cap or cover the injection well as desired. Surrounding a medial portion 70 of the pipe 60 within the borehole 58 is a bentonite slurry 72, which provides a gas-tight seal between the pipe 60 and the borehole 58. The slotted lower portion 74 of the pipe 60 is surrounded by gas-permeable packed sand 76. As will now be apparent, the pipe 60 facilitates the injection of air into the zone surrounding the plume 16.

Figure 2:
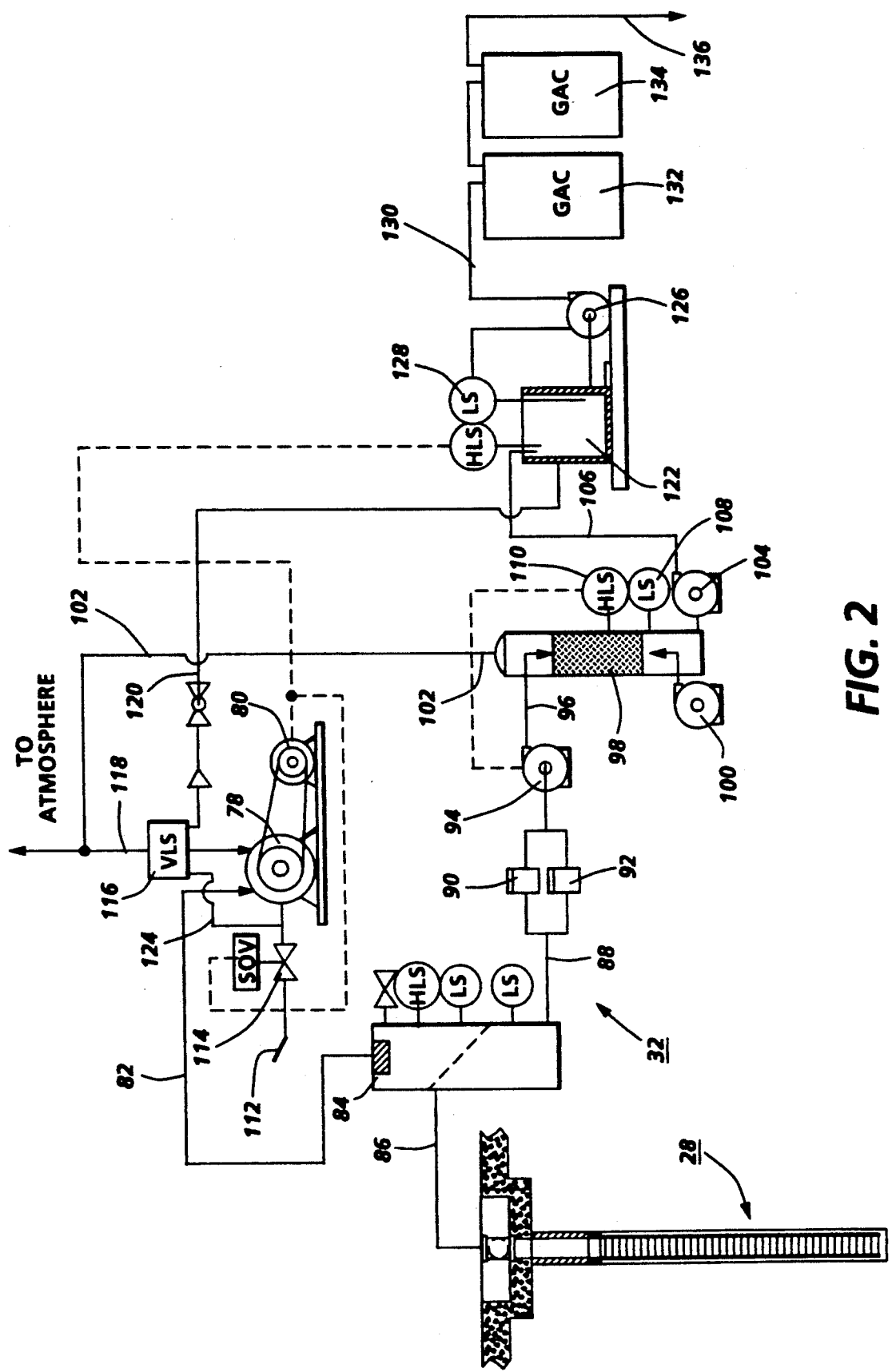
FIG. 2 is a schematic view of apparatus for the handling and treating of materials removed from the ground by two phase vacuum extraction.

Referring now to FIG. 2, the vacuum extraction system 32 and the steps and apparatus for treating extracted material will now be described in greater detail. Referring to FIG. 2, a vacuum pump 78, driven by electric motor 80, is in fluid communication through a pipe 82, knock-out pot 84 and pipe 86 with the extraction well 28. The knock-out pot 84 may be of conventional design, familiar to those skilled in the art.

The knock-out pot 84 serves to separate the two phases emerging from the extraction well 28, enabling them to be subjected to appropriate further processing. In this regard, a pipe 88 is provided in association with the knock-out pot 84, to conduct effluent in the gaseous phase through filtration and stripping steps. Filtration is provided in the illustrated embodiment by parallel bag filters 90 and 92 which may alternately or simultaneously be used in a conventional manner. Cut-off valves, omitted in the drawings for clarity permit either filter 90, 92 to be isolated, and each bag removed, cleaned or replaced. Suitable pressure guages, not shown may be placed on the suction and discharge sides of the bag filters 90 and 92 to indicate bag loading. In one operative embodiment, the bag filters 90 and 92 were 50 micron nylon filters, sold by Rosedale Products, Incorporated, capable of passing 222 gpm at 150 psi. Other equivalent separation techniques and apparatus may be used.

A pump 94, for erosion resistance preferably of the single stage progressive cavity (screw) type, serves to draw off the liquid phase effluent of the knock-out pot 84. One suitable pump is sold by the Nemo Pump Division of Netzsch Incorporated, of Exton, Pa., Model Ne-30A. Here, too, other suitable apparatus may be used.

In the illustrated embodiment, the liquid phase is fed from the pump 94 through a pipe 96 to an air stripper assembly 98, the function of which is to remove from the effluent volatile organic compounds. A blower 100 associated with the air stripper assembly 98 delivers a flow of warm air through the housing of the air stripper assembly 98, carrying off the volatile organic compounds through the vent 102 to atmosphere or further processing (not shown). A transfer pump 104, discharging to a pipe 106, serves to transport liquid from the sump of the air stripper assembly 98 for further processing. The transfer pump 104 may be turned off in response to a low level switch 108 associated with the air stripper assembly 98. A high level switch 110 associated with the air stripper assembly 98 controls the pump 94 in response to high water level in the air stripper assembly 98. The air stripper assembly 98 may be a conventional "off-the-shelf" unit, familiar to those skilled in the art.

The air stripper assembly 98 may, if desired, be omitted, and the effluent of the pipe 96 joined with the effluent of the pipe 120. In one pilot installation, it was found that the reduction in the concentration of volatile organic contaminants between the local ground water and the effluent of the pipe 96 is significant, approximately 98.7%, thus rendering the air stripper assembly unnecessary. It is hypothesized that the intimate mixing of the air and water during extraction (at which time ground water is extracted in a low pressure air stream) allows the volatile compounds to come out of solution, thus obviating the need for later air stripping.

Avoidance of the need for an air stripper assembly 98 also reduces the total volume of air streams bearing volatile organic compounds. In situations in which air emissions must be controlled, this is a distinct advantage. Another advantage of the two-phase vapor extraction process, as practiced without additional air stripping, is that due to the low pressure at which the vapor/liquid mixing and separation are accomplished, there is no less oxygenation of the water than would result from conventional air stripping. It is to be expected that lower dissolved oxygen levels will result in less corrosion and fouling of downstream components of the apparatus.

Referring again to FIG. 2, the processing of the vapor phase effluent from the knock-out pot 84 will now be described.

As indicated above, under the influence of the vacuum pump 78, the vapors separated from the two-phase effluent from the extraction well 28 (not seen in FIG. 2) are drawn through the pipe 82 to the vacuum pump 78. In the illustrated form of the invention, the vacuum pump 78 is of the liquid ring type, and is provided with a make up water line 112, served by a domestic supply. The make up water line 112 is provided with a solenoid actuated valve 114 responsive to the high water level switch 110 of air stripper assembly 98.

The pump 78 exhausts to a vapor/liquid separator 116, the vapor effluent of which is conducted to atmosphere, or if appropriate to further processing through a pipe 118. The bulk of the liquid effluent from the vapor liquid separator 116 passes through a pipe 120 to a sump 122, where it joins the effluent of the pipe 106, the liquid output of the air stripper assembly 98. A fraction or all of the liquid effluent of the vapor liquid separator 116 may be drawn off through a line 124 to join the flow in the make up water line 112 servicing the liquid ring pump 78.

A pump 126, controlled by a low level cut-off switch 128, draws liquid from the sump 122 and propels it through a pipe 130 for further processing. In the illustrated embodiment the liquid is passed in two stages through cannisters 132 and 134 containing granular activated carbon. Other contaminant removal steps or techniques may-be used. The treated water emerges through a pipe 136 and is of sufficient purity to allow its return to the soil or a sewer without further treatment.

As was mentioned above, a major advantage of the application of two phase vacuum extraction in accordance with the present invention is that the rate of production of groundwater may be significantly increased over conventional single phase flow rates. By applying vacuum to the subsurface using the extraction well 28 and vacuum extraction system 32 as described above, water is drawn from the soil by the fluid dynamic effects of sweeping air and soil gases over the aquifer surface toward the well and also by the artificial creation of a low head (water pressure) inside the riser pipe 44. The low head in the riser pipe 44 makes it, in effect, a low point in the hydraulic system so that water in the surrounding soil readily flows to it.

Artificially increasing the rate of production of groundwater over what can be achieved with conventional pumps is especially beneficial in subsurface formations through which natural recharge is slow. In addition to increasing the size of the groundwater capture zone around the extraction well 28, operation of the above-described apparatus 10 depresses the natural water table, thereby increasing the volume of the vadose zone which is subject to clean up by the vapor extraction mechanism generated by the apparatus 10. Tangible benefits are shortening of the duration of the treatment time and reduction of the cost of the overall contaminant removal effort.

In one pilot installation, over a four month trial period, operation of the apparatus 10 caused the local water table to be lowered by over twelve feet while the pressure in the immediate vicinity of the extraction well 28 dropped over 18 in. Hg. The yield of ground water from this well was found to be 3.3 GPM, an improvement over a yield of 0.3 GPM using conventional pumping from the same well. In this installation, which employed a riser pipe 44 of four inches in diameter and a perforated length of approximately 20 feet, average daily mass flow of contaminants TCE and 1,2-DCE was approximately 4.4 lbs. in the vapor phase. Simultaneously, approximately 23 lbs. per day of TCE and 1,2-DCE were removed from the recovered groundwater when pumping at a volume of 3.3 GPM.

Soil sampling adjacent to the three air inlet wells 30 used showed a decrease in the concentration of volatile organic compounds from $3.44 \times 10^4$ ug/kg to $3.65 \times 10^2$ ug/kg. This decrease in contamination was observed at depths of 5-7 feet. It was also found that the drawn down in the overburden aquifer ranged from 0.1-9.37 feet below static water level, further evidence of the influence of the apparatus 10, while the radius of the cone of depression around the extraction well 28 approximated 100 feet. Draw downs in the bedrock aquifer were found to be neglible during the same period. The capture zone in the overburden aquifer was demonstrated to extend approximately 200 feet radially crossgradient of natural groundwater flow and 125 feet downgradient.

The present invention may be embodied in other specific forms without departing from its spirit and essential attributes. Accordingly, reference should be made to the appended claims rather than the foregoing specification as indicating the scope of the invention.

We claim:

1. Apparatus for removal of volatile contaminants from a contaminated area of the ground, comprising:
   an extraction well extending downwardly from the surface of the ground to a level below the water table, said well comprising a perforated riser pipe, wherein at least some of the perforations of the riser pipe are disposed below the water table;
   at least one air injection well extending downwardly from the surface of the ground into at least the vadose zone and spaced from said extraction well;
   vacuum means for forming a zone of reduced pressure around said extraction well, for drawing soil gases and entrained liquid into the extraction well, and for conveying said soil gases and entrained liquid to the surface as a common two-phase stream, said vacuum means being in fluid communication with said perforated riser pipe;
   means for receiving said common stream and separating said stream into separate gas and liquid streams;
   means for receiving said gas stream and removing therefrom residual liquid;
   means for receiving the residual liquid from said gas stream and said liquid stream; and
   means for removal of contaminants from said residual liquid.

2. Apparatus in accordance with claim 1, and means for receiving said liquid stream and for removing therefrom entrained gases and volatile organic contaminants.

3. An apparatus for removing contaminants from a contaminated area of the ground having a water table and a vadose zone above the water table which comprises a perforated riser pipe extending downwardly from the surface of the ground of a level below the water table, wherein at least some of the perforations of the riser pipe are disposed below the water table, vacuum means for forming a zone of reduced pressure around said extraction well, for drawing soil gases and liquids into the extraction well, and for conveying said soil gases and liquids to the surface as a common stream, said vacuum means being in fluid communication with said perforated riser pipe, and means for receiving the common stream and separating the common stream into separate gas and liquid streams above ground.

4. An apparatus according to claim 3 wherein the perforations in the riser pipe are situated only below the water table.

5. An apparatus according to claim 3 wherein the perforations in the riser pipe are situated both in the vadose zone and below the water table.

6. An apparatus according to claim 3 also including a means for receiving the gas stream and removing therefrom residual liquid, a vessel for receiving the residual liquid from the gas stream and the liquid stream, and a means for removal of residual contaminants from the liquid.

7. An apparatus according to claim 3 also including at least one air injection well extending downwardly from the surface of the ground and spaced from the riser pipe.

* * * * *